(12) United States Patent
Madsen et al.

(10) Patent No.: US 6,317,758 B1
(45) Date of Patent: Nov. 13, 2001

(54) METHOD AND SYSTEM FOR DETECTING AND SELECTIVELY CORRECTING CELL REFERENCE ERRORS

(75) Inventors: Robert C. Madsen; Daren A. Thayne, both of Orem; Gary L. Gibb, Lindon, all of UT (US)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 09/026,703

(22) Filed: Feb. 20, 1998

(51) Int. Cl.[7] .................................................. G06F 15/00
(52) U.S. Cl. .......................... 707/504; 707/503; 707/508
(58) Field of Search ..................................... 707/503, 504, 707/538, 508

(56) References Cited

U.S. PATENT DOCUMENTS

| | | | |
|---|---|---|---|
| 5,471,612 | * 11/1995 | Schlafly | 707/104 |
| 5,603,021 | * 2/1997 | Spencer et al. | 707/4 |
| 5,633,998 | * 5/1997 | Schlafly | 714/1 |
| 5,742,835 | * 4/1998 | Kaehler | 707/503 |
| 5,842,180 | * 11/1998 | Khanna et al. | 705/30 |
| 5,883,623 | * 3/1999 | Cseri | 707/503 |

OTHER PUBLICATIONS

Microsoft Excell User's Guide 1, Jan. 1992.*
Microsoft Excell User's Guide 1, p. 120, 131–135 and 142, Jan. 1992.*

* cited by examiner

*Primary Examiner*—Jack Choules
*Assistant Examiner*—Greta L. Robinson
(74) *Attorney, Agent, or Firm*—Fenwick & West LLP

(57) ABSTRACT

In a computer implemented spreadsheet, a method for detecting and selectively correcting cell reference errors after a cell is copied includes identifying at least one destination cell containing a formula with a reference error; and converting the address of at least one reference in the formula of the at least one destination cell from a relative address to an absolute address. A system for carrying out the claimed method includes a spreadsheet application module, a cell module, an error detection and correction module, a user dialog module, a dependency display module, a fix memory, and a rejection memory.

34 Claims, 11 Drawing Sheets

METHOD AND SYSTEM FOR DETECTING AND SELECTIVELY CORRECTING CELL REFERENCE ERRORS

BACKGROUND OF THE INVENTION

1. Field of the Invention

The present invention relates generally to spreadsheet software, and more particularly, to a method and system for detecting and selectively correcting cell reference errors in a spreadsheet.

2. Description of the Background Art

In recent years, spreadsheet programs such as Corel® Quattro® Pro have become ubiquitous in the office and are gaining widespread popularity in the home. Spreadsheet programs are computer software applications used for creating and manipulating spreadsheets. In general, spreadsheets are tables of values arranged in rows and columns, which are used for a variety of applications from financial accounting to scientific research. Traditionally, spreadsheets were kept on paper, but maintaining a spreadsheet by hand was time-consuming and prone to human error. With the advent of computer-implemented spreadsheets, however, spreadsheets are easier to maintain, and benefit from the speed and accuracy of electronic recalculation.

In a spreadsheet program, each value is stored in a virtual box called a "cell," which contains a single piece of data. Each cell has a unique name (often called an "address") derived from its row and column in the spreadsheet. Typically, the column is identified by a letter, and the row is identified by a number. For example, the address "C17" refers to the cell at column C and row 17. Ranges of cells may also be defined by identifying a starting and an ending cell, and concatenating the two references with a range symbol. For example, the range of cells comprising C17 through C20 is defined by the expression "C17 . . . C20."

Generally, the data stored in a cell is one of three types—numbers, text, or formulas. A formula defines a relationship between cells, usually in the form of a mathematical function or expression. The output of the formula is a value that is displayed in the spreadsheet, although the actual contents of the cell is the formula itself.

An example of a basic spreadsheet using a formula is one that calculates home mortgage payments. Normally, this spreadsheet includes cells for storing the cost of the home, the down payment, the mortgage rate, the mortgage term, and the monthly payment. The relationship between the cells is defined by a formula, which may be a pre-defined function as in some spreadsheet programs such as Corel® Quattro® Pro, or it may be a user-specified formula. After the user inserts values into the cells corresponding to the variables of the function, the spreadsheet automatically calculates and displays the mortgage payment.

Formulas refer to other cells by means of cell addresses, also known as cell references. Cell addresses are typically expressed in one of three ways: absolute, relative, or mixed. In general, the difference between these addressing modes is only relevant when the cell containing the reference is copied or moved. However, the difference is often a source of confusion for the uninitiated, as will be seen below.

In absolute addressing, a reference does not change when the cell containing the reference is copied. An absolute address is normally identified by a "$" symbol that precedes both the row and the column component the address. For example, cell "C20" may contain an absolute reference to cell "$C$17." If the contents of cell "C20" is subsequently copied into cell "C21," the reference is copied, unchanged, into cell "C21," so that both cell "C20" and cell "C21" contain the absolute reference to cell "$C$17."

However, sometimes it is advantageous to allow a reference to change when the cell containing it is copied. For example, a spreadsheet may include a number of columns corresponding to monthly sales figures. At the bottom of the first column, the user may enter a summation formula in order to add the cells in the column. However, instead of retyping the formula for each column, the user may prefer to simply copy the formula to the remaining columns. With absolute addressing, the results would not reflect the user's intent, since each copied formula would reference the cells in the first column rather than referencing the cells in the column corresponding to the location of the copied formula. Thus, another addressing mode, called relative addressing, has been developed to resolve this problem.

In relative addressing, the reference points to a position in the spreadsheet relative to the cell containing the reference, rather than to the absolute address. Internally, the reference is stored in terms of the row and column offset from the cell containing the reference (e.g., three rows up and two columns to the right). Thus, the cell pointed to by a relative reference changes when the containing cell is copied or moved. In most spreadsheet programs, relative addressing is the default mode. For example, if cell "C20" contains a reference to cell "C17," the reference internally points to any cell that is three cells above the one containing the reference. As a result, if cell "C20" is copied into cell "C21," cell "C21" will then refer to cell "C18," and not cell "C17," as was the case in absolute mode.

In mixed addressing, a cell reference contains both absolute and relative address components. For example, an address "$C17" is absolute for the column component, but relative for the row component. Thus, if the cell containing the reference is later copied, the column will not change, whereas the row will change if appropriate. Conversely, the address "C$17" is relative for the column, but absolute for the row. If the cell is later copied, the column will change if appropriate, whereas the row will not.

Many users are not familiar with the different addressing modes that exist in virtually every spreadsheet program. This is particularly true for many home users. As a result, inexperienced users sometimes rely on the default (relative) addressing mode when absolute addressing is required. Such mistakes often result in unexpected results or errors that are difficult for ordinary users to find and correct.

One example of the problem is shown below in connection with FIGS. 3A–B. FIG. 3A illustrates a simple spreadsheet 300 for calculating a salary, which includes a plurality of cells 301 for storing a commission rate, a base salary, and three months of sales results. Because the present description is in the context of cell copying operations, the spreadsheet 300 includes a source cell 302 and a destination cell 304. Referring to FIG. 3A, a user initially entered into the source cell 302 the formula "+B31+B30*B29," which adds the base salary to the product of the commission rate and the January sales results. The formula yields the expected monthly salary of $2,500.

Referring now to FIG. 3B, the user next copied the formula in the source cell 302 into the destination cell 304, instead of retyping the formula. However, the calculated result in the destination cell 304 is incorrect, at least from the standpoint of the user's expectations. Because the original formula the source cell 302 used relative addresses, as is typically the default mode, the cell references were changed when the formula was copied. Thus, the new formula in the destination cell 304 is "+C31+C32*C29." However, cell "C29" is empty, which the spreadsheet program interprets as a zero. Thus, the formula produces an unexpected and incorrect result. The problem lies in the fact that the user assumed that "B29" was an absolute reference, when it was actually relative.

Another example of the problem is shown in FIGS. 4A–B, which illustrate a spreadsheet 300 for calculating a monthly loan payment for a variety of interest rates. Referring first to FIG. 4A, the user entered into the source cell 302 a predefined payment function "@PMT(B4,B7/12,B5*12)" in order to calculate the payment at 7.00% interest. Next, in FIG. 4B, the user copied the formula into the destination cell 304, intending to calculate the payment at 7.25% interest. However, as in the preceding example, the relative cell references were changed during the copy such that the formula in the destination cell 304 became "@PMT(C4,C7/12,C5*12)." As before, some input variables of the new function, specifically "C4" and "C5", refer to empty cells. Here, the payment function generated an error ("ERR") because it could not tolerate having a zero for certain input values.

The problem shown in FIG. 3B is particularly insidious because inexperienced users may not detect the error before relying on inaccurate calculations. However, even if the error is obvious, as illustrated in FIG. 4B, an inexperienced user may not know how to solve the problem. What is needed, therefore, is a method and system for detecting cell reference errors caused by copying cells containing relative address references. What is also needed is a method and system for notifying a user as to potential cell reference errors and presenting the user with options for correcting those errors.

SUMMARY OF THE INVENTION

The present invention provides a method and system for detecting and selectively correcting cell reference errors caused by copying at least one source cell containing a relative addresses to at least one destination cell. In accordance with the present invention, a method includes identifying at least one destination cell that contains a formula with a reference error and selectively converting the address of at least one reference in the formula of the at least one destination cell from a relative address to an absolute address.

In another aspect of the invention, the method includes identifying the reference in the at least one destination cell that caused the reference error; calculating a relative-to-absolute conversion of the address of the reference that will correct the reference error; prompting the user as to whether the conversion should be made in the spreadsheet; and responsive to the user approving the conversion, converting the reference in both the source and destination cells in accordance with the calculated conversion.

In accordance with the present invention, a system for detecting and selectively correcting cell reference errors includes a spreadsheet application module for providing a spreadsheet comprising a plurality of cells arranged by row and column, the cells including a source cell and a destination cell, and the source cell comprising a formula; coupled to the spreadsheet application module, a cell copier module for copying the formula of the source cell into the destination cell; coupled to the cell copier module, an error detection and correction module for detecting and selectively correcting at least one reference error; coupled to the error detection and correction module, a first memory for storing a relative-to-absolute conversion of an address; coupled to the error detection and correction module, a second memory for storing at least one relative-to-absolute conversion that was previously rejected by a user; coupled to the error detection and correction module, a user dialog module for providing the user with information pertaining to the reference error, and for prompting the user in order to determine whether the at least one reference error should be corrected; coupled to the user dialog module, a dependency display module for displaying a dependency graph of a set of references in the destination cell.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The following description is made in the context of detecting and selectively correcting cell reference errors in a spreadsheet. However, those skilled in the art will recognize that the same principles apply to other software applications, including, for example, word processors and database programs. In addition, the following description relates to converting relative cell addresses into absolute cell addresses. However, those skilled in the art will recognize that the method and system of the present invention may be adapted to convert absolute addresses into relative addresses.

Figure 1:
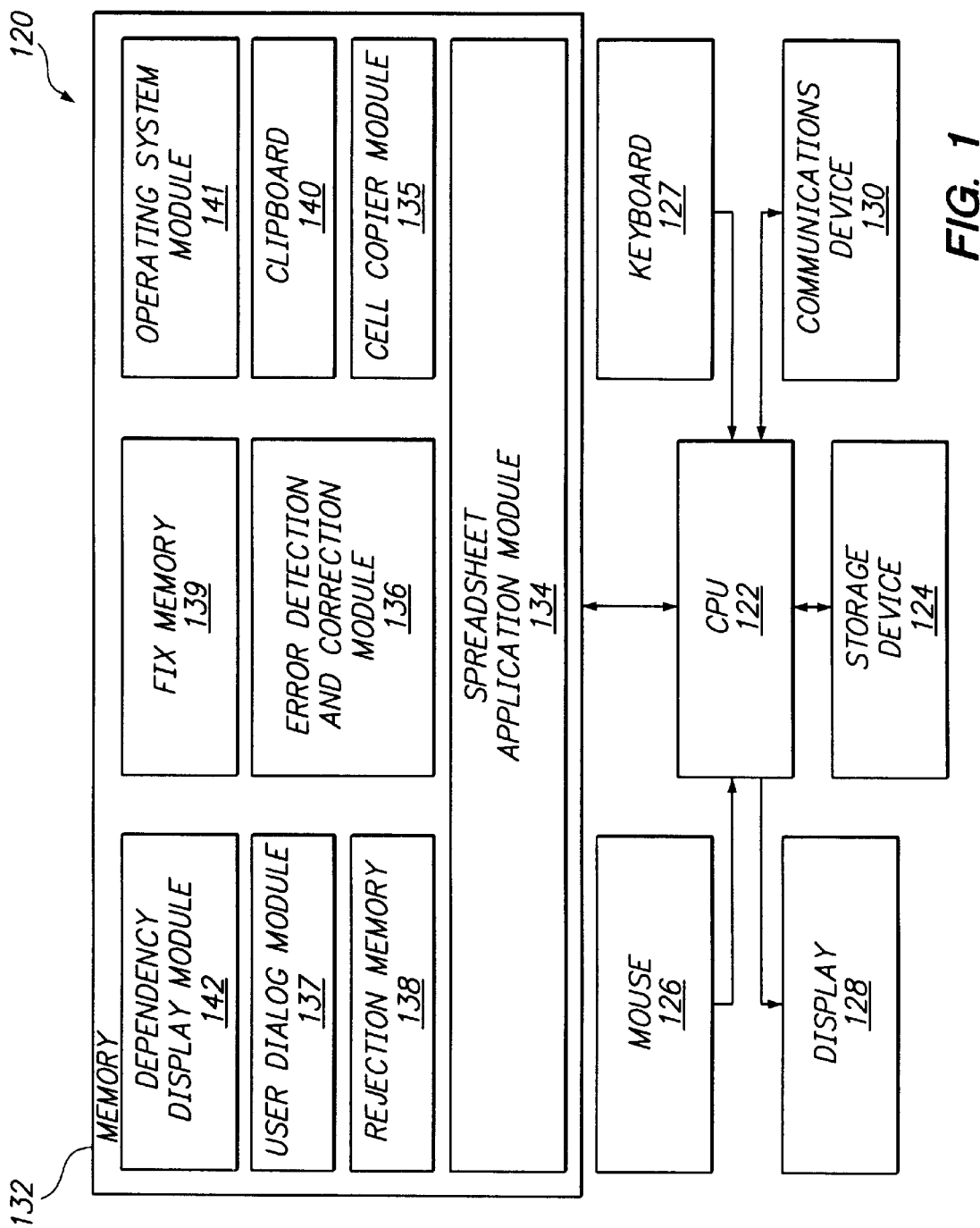
FIG. 1 is a physical block diagram of a system for detecting and selectively correcting cell reference errors in accordance with the present invention.

Referring now to FIG. 1, there is shown a physical block diagram of a system 120 for detecting and selectively correcting cell reference errors in accordance with the present invention. In one embodiment, the present invention is implemented as software running on a conventional personal computer such as an IBM® PC or compatible. Thus, the hardware architecture of system 120 as shown in FIG. 1 is preferably implemented as a combination of components of such computer, although other implementations are possible.

A central processing unit (CPU) 122 executes software instructions and interacts with other components to perform the methods of the present invention. Storage device 124 provides long term storage of data and software programs, and may be implemented as a hard disk drive or other suitable mass storage device. Input devices, such as a mouse 126 and keyboard 127, facilitate user control of the operation of system 120. A display device 128 is an output device such as a cathode-ray tube for the display of text and graphics under the control of CPU 122. System 120 may also include communication device 130 such as, for example, a modem for connection to a computer network such as the Internet.

System 120 also includes a memory 132 for storing software instructions to be executed by CPU 122, and for storing spreadsheets 300 and other data. Memory 132 is implemented using a standard memory device, such as a random access memory (RAM). In a preferred embodiment, memory 132 includes a number of software objects or modules, including a spreadsheet application module 134, a cell copier module 135, an error detection and correction module 136, a user dialog module 137, and a dependency display module 142. Throughout this discussion, the foregoing modules are assumed to be separate functional units, but those skilled in the art will recognize that the functionality of various modules may be combined and even integrated into the overall spreadsheet application.

In a preferred embodiment, the memory 132 also includes a rejection memory 138, a fix memory 139, and a clipboard 140, the operation of which is described in more detail below. In addition, the memory 132 includes an operating system 141, for managing, and providing system resources to, the above-mentioned software objects or modules. Preferably, operating system 141 is the Windows 95 operating system manufactured by Microsoft Corporation of Redmond, Wash., although other operating systems may be used within the scope of the present invention.

Spreadsheet application module 134 provides the functionality of a conventional spreadsheet program, such as providing a spreadsheet 300 with a plurality of cells 301 in which values and formulas may be stored. Coupled to the spreadsheet application module 134 is the cell copier module 135, which is invoked when cell copying operations are initiated by the user in the spreadsheet application module 134. Coupled to the cell copier module 135 is the error detection and correction module 136, which detects potential cell reference errors and calculates a "fix" for correcting the errors. Thereafter, if the user accepts the fix, then the error detection and correction module 136 implements the fix in the spreadsheet 300. Coupled to the error detection and correction module 136 is the user dialog module 137, which is invoked to prompt the user as to whether the fix should be implemented in the spreadsheet 300. The user dialog module is coupled to the dependency display module 142, which displays a dependency graph corresponding to the cells that are referenced by the formula in the destination cell 304.

Figure 3A:
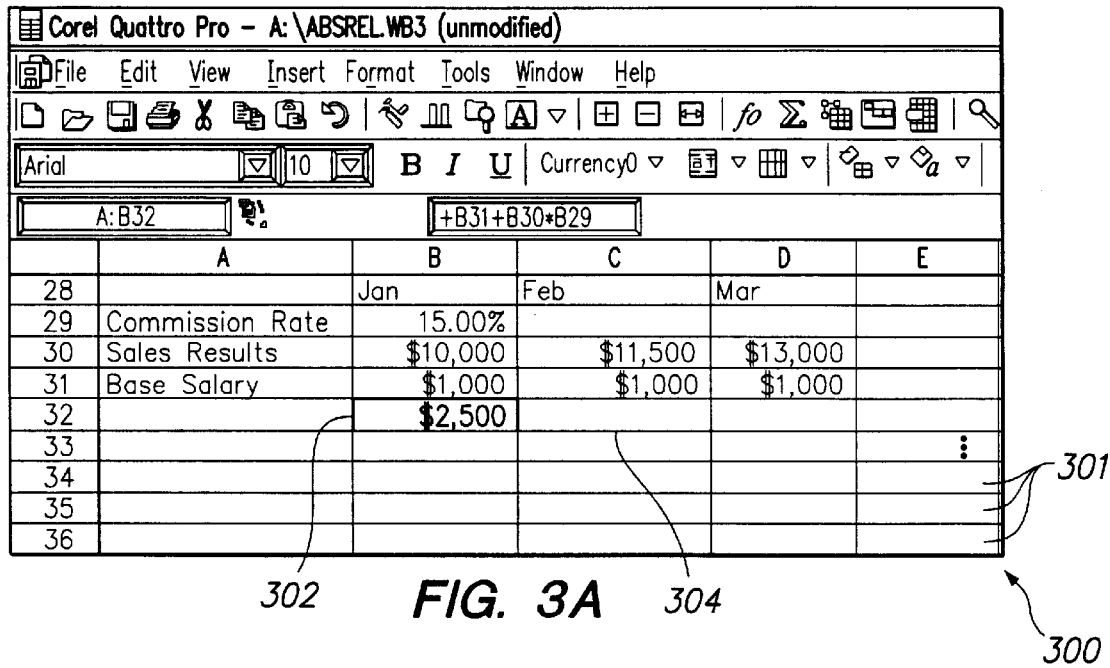
FIGS. 3A–B are exemplary screen shots of a first cell reference error caused by cell copying.
Figure 3B:
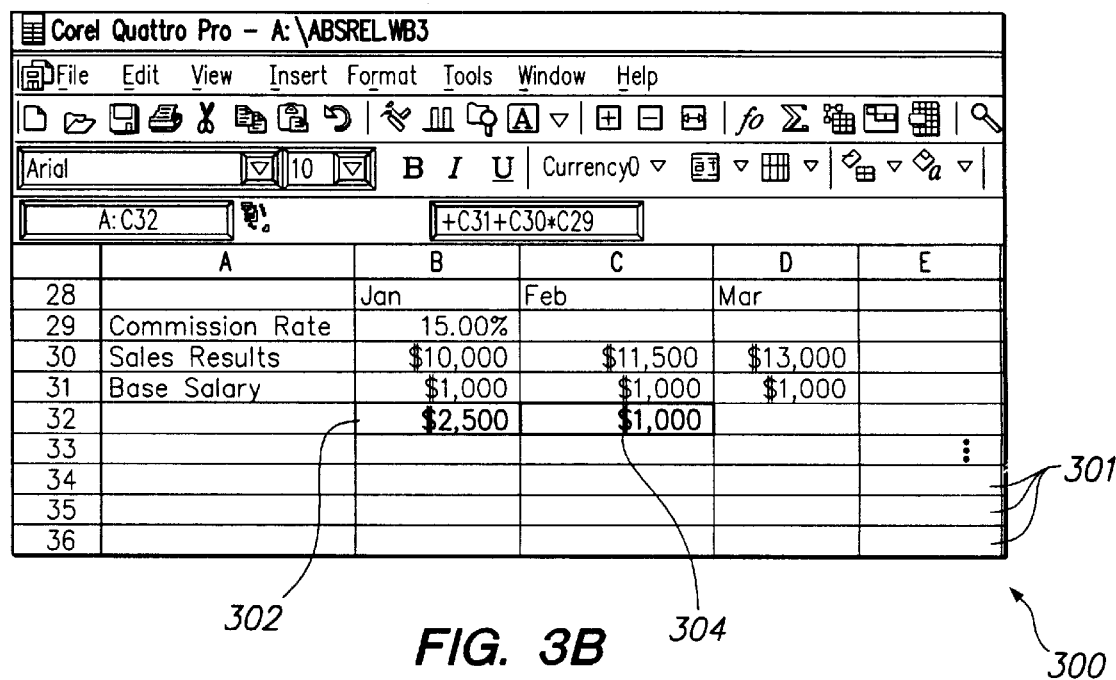

Reference is made again FIGS. 3A–B, which illustrate a common cell reference error. As noted earlier, the problem arose because the user assumed that a reference in the source cell 302 would behave as an absolute reference, when it was actually a relative reference. Consequently, the copied formula referred to an empty cell 301, which the spreadsheet application module 134 interpreted as a zero. The present invention is directed toward a method and system for detecting and selectively correcting such errors.

Figure 2:
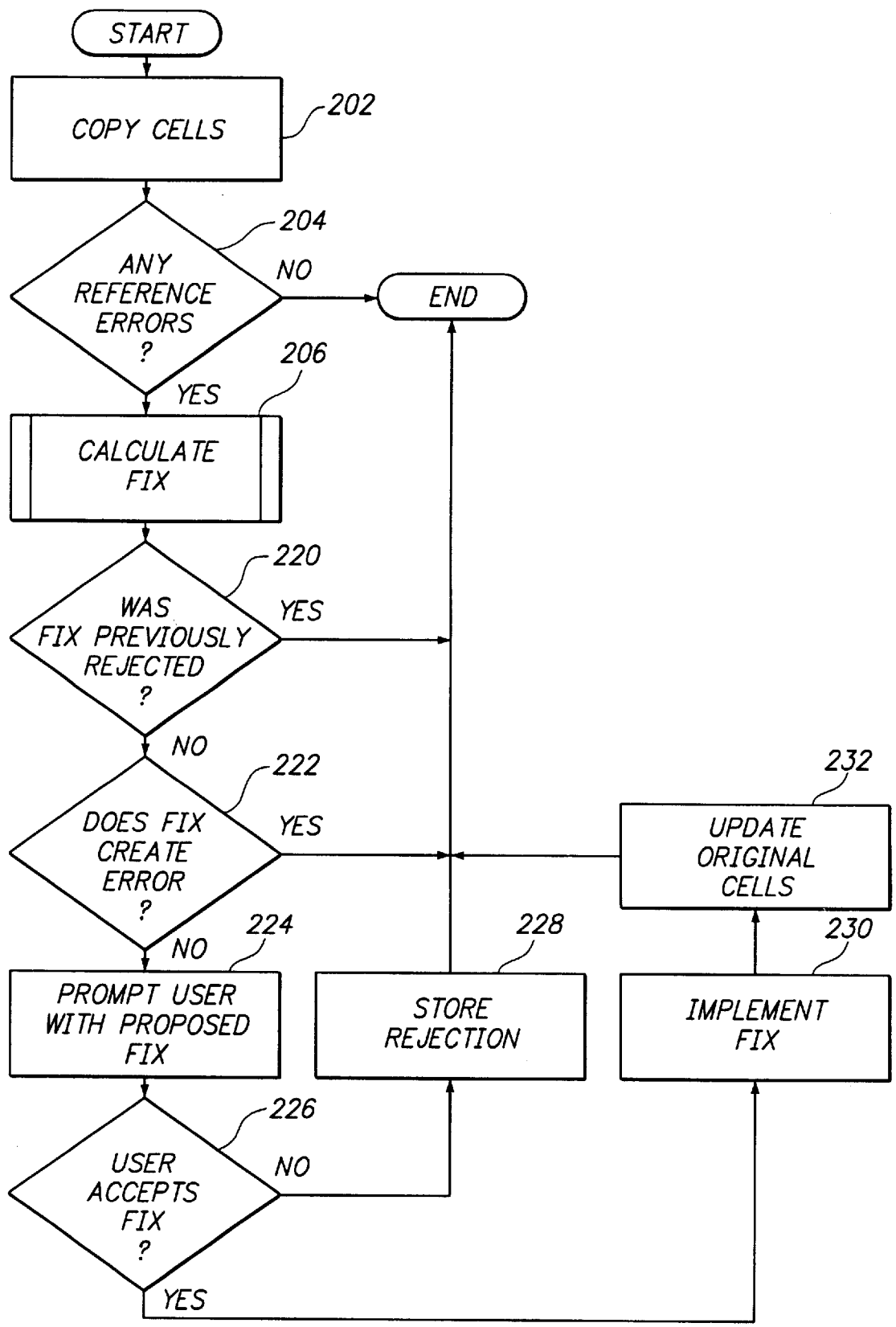
FIG. 2 is a flow diagram for a preferred method of detecting and selectively correcting cell reference errors in accordance with the present invention.

Referring also to FIG. 2, there is shown a flow diagram for a preferred method of detecting and selectively correcting cell reference errors in accordance with the present invention. The method begins by copying 202 the source cell 302 into the destination cell 304. Although the following description is in the context of cell copying, one skilled in the art will recognize that similar problems may be encountered in other circumstances wherein a formula is entered into a cell. For example, the user may directly input a formula that results in an error. Similarly, errors may be generated by cell "fill" operations. Consequently, in a preferred embodiment, the method and system of the present invention also detects and selectively corrects cell reference errors in these related contexts. Additionally, one skilled in the art will recognize that multiple cells 301 may be copied in a single operation, although the example discussed below with reference to FIGS. 3A–F is in the context of copying a single cell 301.

Most Windows 95 spreadsheet programs perform cell copying operations in a similar manner, although some variations exist. In general, the user selects the source cell 302 by clicking on a cell 301 with the mouse 126. A range of cells 301 may also be selected by dragging the mouse pointer over two or more cells 301 in a manner well known to those of skill in the art. After the source cell 302 is selected, the user chooses the "copy" command from the "edit" menu. The "copy" command, which exists in most Windows applications, invokes the cell copier module 135 in order to copy the contents of the source cell 302 into the clipboard 140. The clipboard 140 is a region of memory 132 managed by operating system 141 that is used for copying data between and within applications. The user then clicks on the destination cell 304 with the mouse 126. Thereafter, the user selects the "paste" command from the "edit" menu, which copies the contents of the clipboard 140 into the destination cell 304.

In prior art spreadsheets, processing would terminate at this point. The copied cell reference would be determined based on whether the source reference was absolute or relative, as described above. Indeed, as shown in FIG. 3B, a spreadsheet without the benefit of the present invention terminates with an "incorrect" (from the user's perspective) value in destination cell 304. However, in accordance with the present invention, the method continues by determining 204 whether the destination cell or cells 304 contain reference errors. A reference error exists where the destination cell 304 contains a reference to a blank, a type mismatched, or an out-of-range cell.

A blank cell 301 is simply a cell without a value, or an empty cell. A type mismatched cell 301 is one that does not match the expected type of data required by the formula in which the reference is used. For example, if the formula in the destination cell 304 requires numeric input, but the reference points to a cell containing text, then the reference is type mismatched.

Figure 5A:
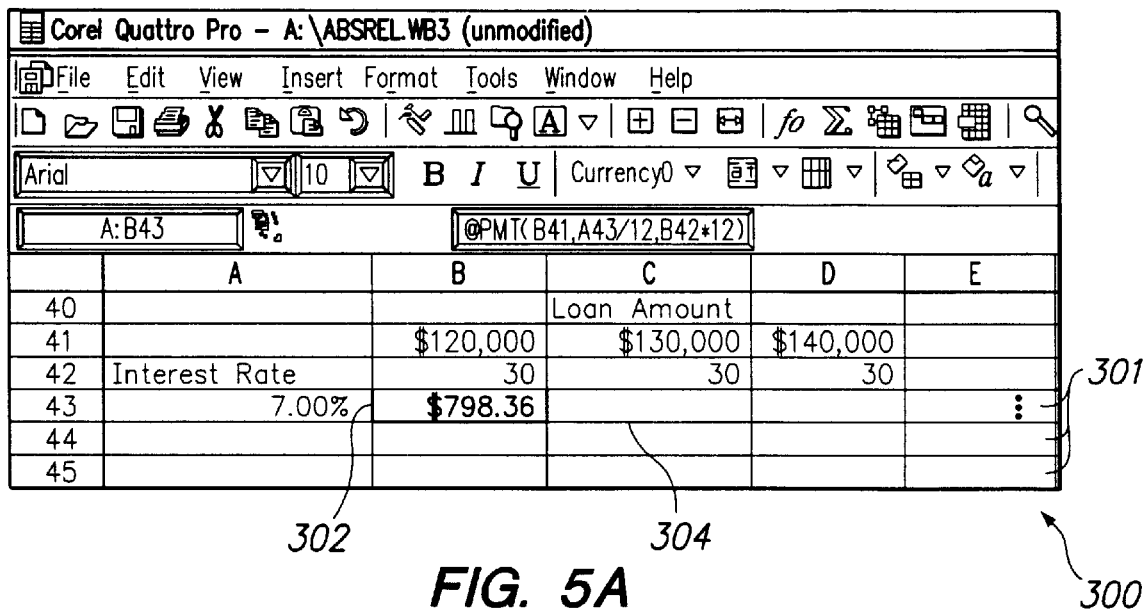
FIGS. 5A–B are exemplary screen shots of a third example of a cell reference error caused by cell copying.
Figure 5B:
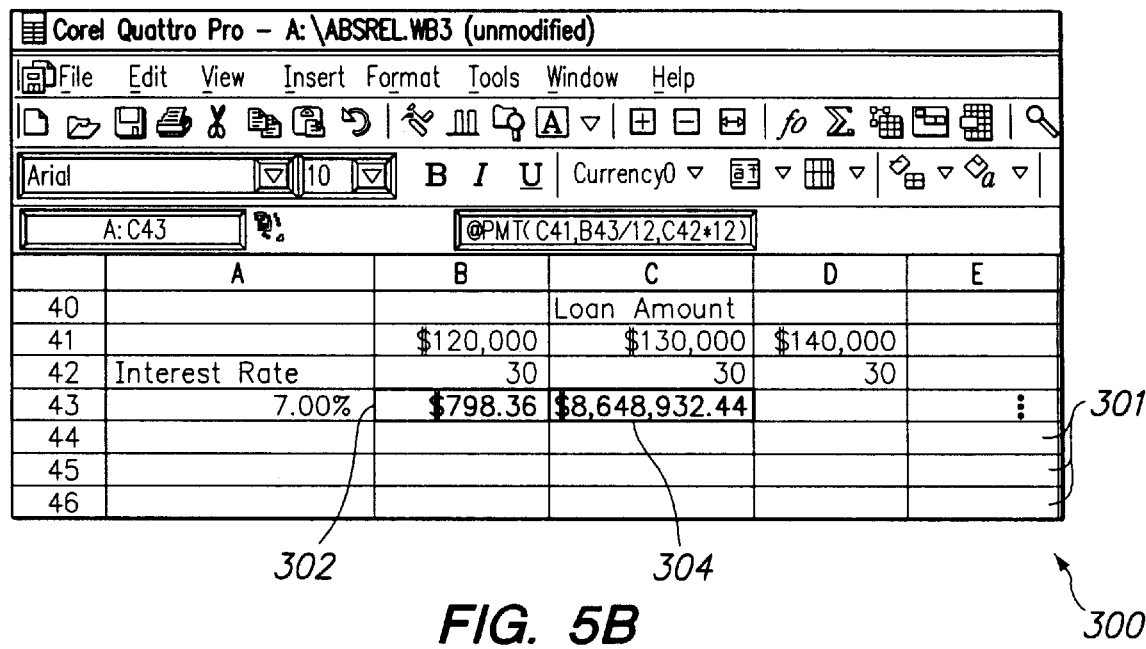

An out-of-range cell 301 is an indication that the cell value is likely to be incorrect given the context of the reference. In one embodiment, this condition is deemed to have occurred if three conditions are satisfied: (1) a reference points back to the source cell 302; (2) the formula in the destination cell 304 and the formula in the source cell 302 produce values of a very different magnitude (i.e. one value is less than 5% of the other); and (3) the formula is not a simple series calculation (i.e. "+A1+A2+A3"). The foregoing problem is illustrated in FIGS. 5A–B, which contain screen shots of a spreadsheet 300 for calculating a monthly payment based on several principal amounts. In FIG. 5A, the user entered into the source cell 302 the function "@PMT (B41,A43/12,B42*12)," which calculates a monthly payment at 7% interest for a loan amount of $120,000. Next, in FIG. 5B, the user copied the contents of the source cell 302 into the destination cell 304, intending to calculate the payment for a loan amount of $130,000. However, the formula in the destination cell 304 calculated a payment amount of $8,648,932.44, which was clearly not what the user expected.

Unlike the preceding examples, none of the formula references in the destination cell 304 pointed to blank or mismatched cells 301. Nevertheless, an error still occurred because the reference in the source cell 302 to "A43" (the interest rate) was changed by the copy operation to "B43" (the source cell 302). In addition, the two formulas produced values of a very different magnitude; in this case, the value of the destination cell 304 was more than 10,000 times greater than the value of the source cell 302. Finally, the formula in question (the "@PMT" function) was not simple series calculation. As a result, the referenced cell 301 is "out-of-range."

In another embodiment, a cell may be "out-of-range" whenever the cell's contents are in some way invalid for the formula using them. For example, a "term" function may be used to determine the length of time necessary to repay a loan. However, the cell corresponding to the payment may contain a value insufficient repay the loan in any number of years given the interest rate and loan amount. Thus, the cell is "out-of-range" in the context of its referencing formula.

If blank, type mismatched, or out-of-range cells 301 are pointed to by a reference, it is a good indication that the user probably intended the reference in the source cell 302 to be absolute instead of relative. In the example spreadsheet of FIG. 3B, it is clear that the destination cell 304 has a reference error since the formula refers to a blank cell ("C29"). Thus, the user probably intended that the reference "B29" should have been absolute ("$B$29"), and not relative, as entered.

If, in step 204, no references are found to point to blank, type mismatched, or out-of-range cells 301, then the method terminates; otherwise, the method continues by calculating 206 a fix 306 (not shown), or a set of relative-to-absolute conversions, for correcting the cell reference errors. In a preferred embodiment, the fix 306 is initially stored in the fix memory 139 before it is implemented in the spreadsheet 300.

Figure 2A:
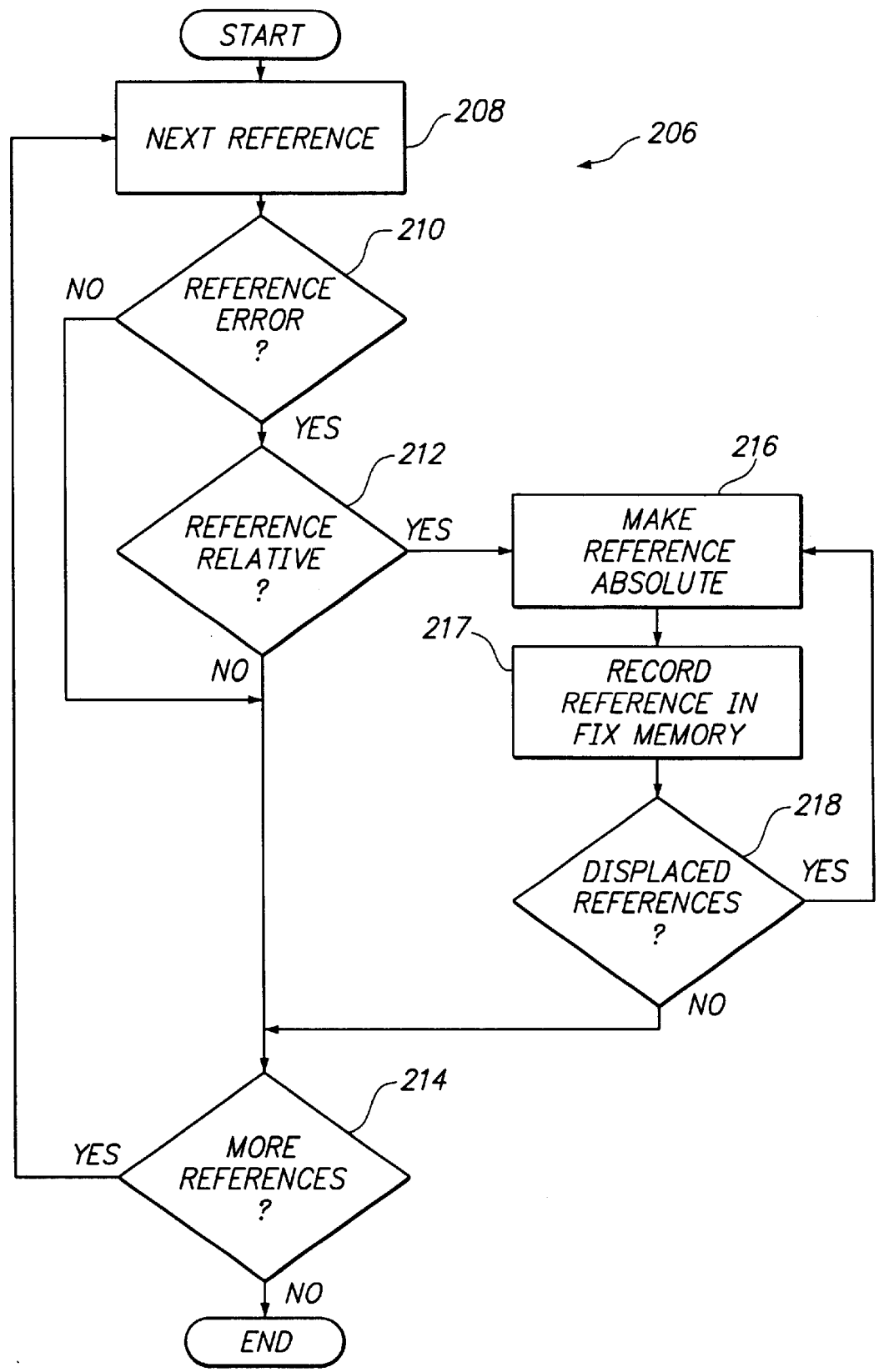
FIG. 2A is a flow diagram for a preferred method of calculating a set of corrections to cell reference errors in accordance with the present invention.

Referring now to FIG. 2A, there is shown a preferred method for calculating the fix 306. The method begins by selecting 208 the next cell reference. Preferably, only references in those destination cells 304 that were found to contain errors in step 204 are selected. Next, the method continues by determining 210 whether the reference has an error, i.e., whether the referenced cell 301 is blank, type mismatched, or out-of-range, using the methods discussed in step 204.

If the reference is not determined to have an error, then the method continues at step 214; otherwise, the method continues by determining 212 whether the reference is relative.

A reference is relative if the "$" symbol is absent in the relevant column or row component of the address, as discussed hereafter. In a preferred embodiment, only the component that was changed as a result of the cell copy operation in step 202 is "relevant" since, preferably, only the changed component will be converted from relative to absolute. In other words, when a source cell 302 is copied 202, the destination cell 304 may have a different column, a different row, or both. If only the column component was changed, then, preferably, only the column will be made absolute. The same is true if only the row is changed. If both the column and the row is changed, then the entire address will be made absolute. Thus, in step 212, a determination is made whether the changed component is relative.

If the reference is not found to be relative, then the method continues at step 214; otherwise, the method continues by converting 216 the address of the reference from relative to absolute. Because the converted (absolute) reference must have the same row and column as it originally had in the source cell 302, the address of the source cell 302 must be known. This may be accomplished, for example, by storing the address of the source cell 302 in the memory 132. In the example spreadsheet of FIGS. 3A–B, the source cell 302 was "B32," and the original reference was "B29."

Next, the "$" symbol is added to the relevant component (s) of the reference in order to make the reference absolute. Thus, in the example spreadsheet of FIGS. 3A–B, the relative address "B29" is changed to the mixed address "$B29," since only the column component was changed when source cell 302 was copied into destination cell 304.

As noted above, once the address of the reference is converted from relative to absolute, it is not immediately inserted into the destination cell 304. Instead, a copy of the original and fixed formulas as well as the addresses of the source 302 and destination 304 cells are recorded 217 in the fix memory 139 pending acceptance of the changes by the user. In an alternative embodiment, however, the converted reference could be inserted immediately into the destination cell 304. Later, if the user chose to reject the change, the system 120 could invoke an "undo" feature of the spreadsheet application module 134 to remove the change. In the example spreadsheet of FIGS. 3A–B, the original formula "+C31+C30*C29," the fixed formula "+C31+C30*$B29," as well the source cell 302 ("B32") and destination cell 304 ("C32") are stored in the fix memory 139.

Figure 6A:
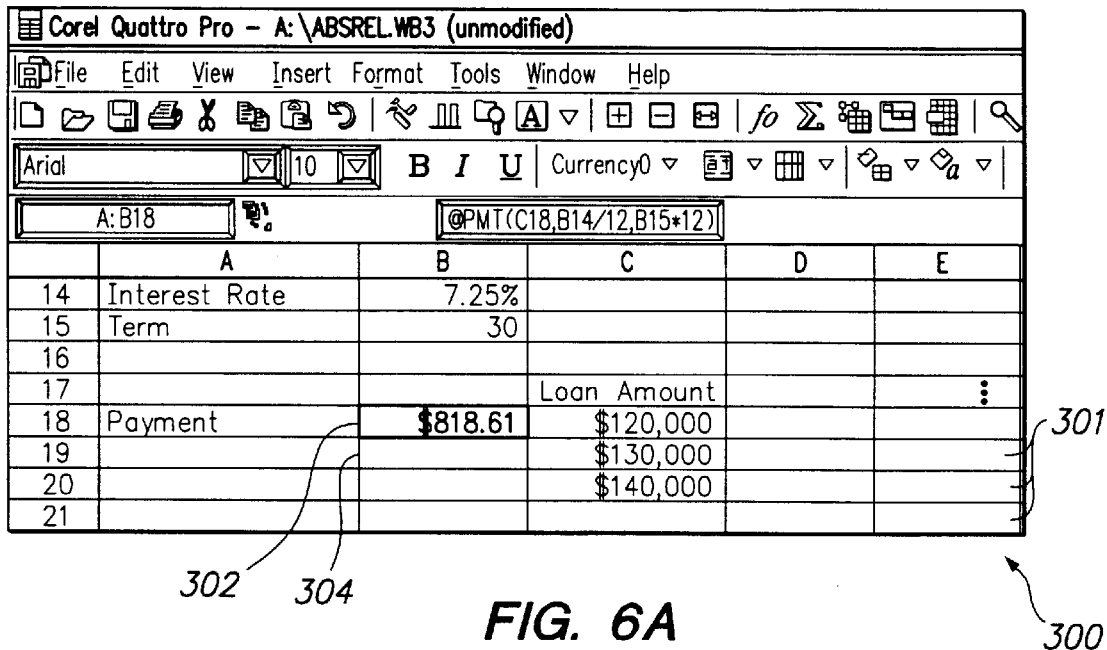
FIGS. 6A–B are exemplary screen shots of spreadsheet including a displaced cell reference in accordance with the present invention.
Figure 6B:
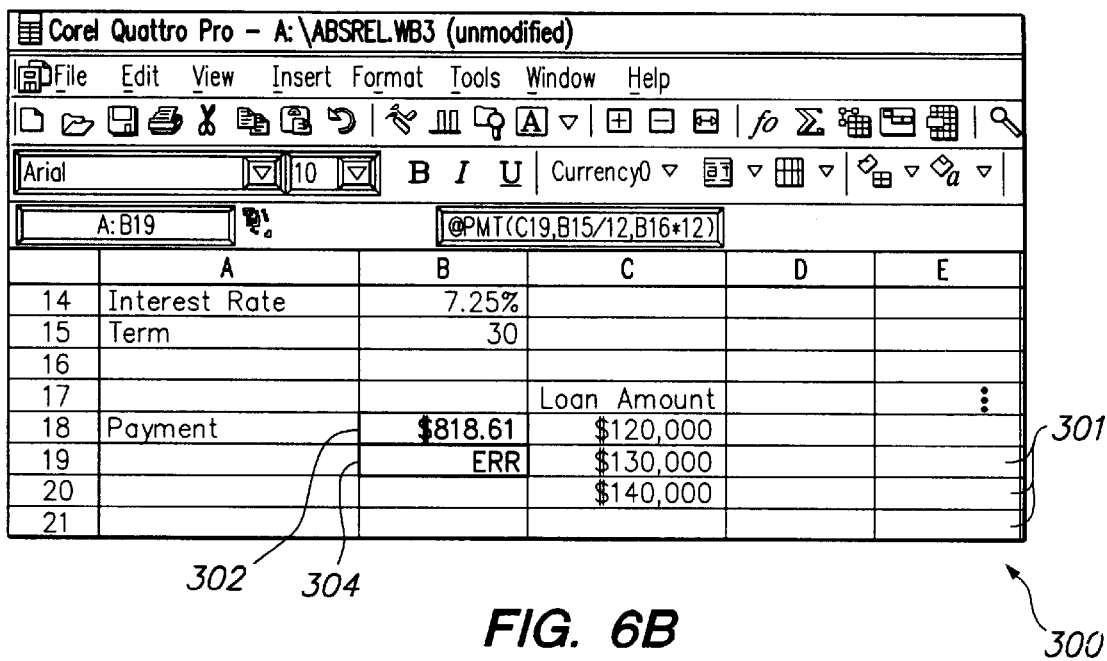

In certain situations, converting a reference from relative to absolute will necessitate the similar transformation of other references. One such case is illustrated below with respect to FIGS. 6A–B, which contain exemplary screen shots of another spreadsheet 300 for calculating mortgage payments. In FIG. 6A, the user entered into source cell 302 the formula "@PMT(C18,B14/12,B15*12)" in order to calculate the monthly payment for a loan amount of $120,000. Next, in FIG. 6B, the user copied the formula of source cell 302 into destination cell 304, intending to calculate the payment at $130,000. However, destination cell 304 generated an error because the changed formula contained a reference to cell "B16," which was blank. In accordance with the methods discussed above, the "B16" reference is converted to "B$15."

However, another (unconverted) reference in the destination cell 304 already refers to cell "B15." Thus, in a preferred embodiment, the unconverted "B15" reference has been "displaced" by the converted "B$15" reference, and must, itself, be converted in order to preserve the correct input values to the formula. Therefore, in accordance with the present invention, the method continues by determining 218 whether any cell references were displaced by the conversion in step 216. If any references were displaced (as in FIG. 6B), then the method returns to step 216, whereupon the displaced references are made absolute and recorded in fix memory 204. If, however, no references were displaced, then the method continues at step 214.

In an alternative embodiment, the step of determining 218 whether any references have been displaced may be deferred until all references have been converted. Thereafter, if the source 302 and destination 304 cells are in the same column, then any unconverted references that are between the converted reference and the edge of the spreadsheet in the same column are deemed to have been displaced and will also be converted. Likewise, if the source 302 and destination 304 cells are in the same row, then any unconverted references that are between the converted reference and the edge of the spreadsheet in the same row are deemed to have been displaced and will also be converted. In this context, the term "edge" is preferably defined as the last cell of the spreadsheet in the direction opposite to the direction of the copy. For example, if the source cell 302 is copied to the right (for example, from column B to column C) then the edge is the first column of the spreadsheet (column A). In addition, the term "between" is understood to include the edge cell and the cell referred to by the converted reference.

After steps 210, 212 or 218, a determination 214 is made whether more references remain to be processed. If more references exist, then the method returns to step 202; otherwise, the fix calculation method 206 terminates.

Referring again to FIG. 2, after the same fix 306 is calculated in step 206, a determination 220 is made whether the fix 306 was previously rejected by the user. In a preferred embodiment, if the user previously rejected a particular proposed fix 306, then the system 120 does not continue to ask the user to accept the same fix 306. The foregoing determination is made by comparing the contents of the fix memory 139 with the contents of the rejection memory 138. As will be seen below, the rejection memory 138 comprises the fixes 306 that the user rejected in the past. Thus, if it is determined 220 that the user had previously rejected the fix 306, then the method terminates, and the fix 306 is not implemented; otherwise, the method continues at step 222. For purposes of the example spreadsheet in FIGS. 3A–F, it is assumed that the fix 306 was not previously rejected by the user.

If the fix 306 was not previously rejected, then the method continues by determining 222 whether the fix 306 will create a formula calculation error if implemented. A formula calculation error occurs when the formula in the destination cell 304 contains references to invalid arguments. Certain financial and scientific formulas only accept arguments within defined ranges. For example, in a payment "term" function, the payment must be sufficient to repay the loan in some number of years given the interest rate and loan amount. Although the formula may reference otherwise valid cells, it may still generate an error if the references are not within the acceptable ranges for that formula. Commonly, spreadsheet programs will display an "ERR" value if a formula calculation error occurs.

In a preferred embodiment, the fix 306 will not be implemented (and the user will not be informed) if the implementation of the fix 306 results in a formula calculation error. This determination is made by testing the fixed formula of fix memory 139 in the context of the destination cell 304. If an "ERR" value is generated, then a formula calculation error exists. In the example spreadsheet of FIGS. 3A, no errors were created by the implementation of the fix 306.

If, in step 222, it is determined that the fix 306 creates an formula calculation error, then the method terminates, since the introduction of such an error would rarely be useful to the user. If, however, the fix 306 does not create an error, the error correction and detection module 136 invokes the user dialog module 137, which, in turn, opens a cell reference checker dialog box 310. In a preferred embodiment, the main purpose of dialog box 310 is to prompt 224 the user as to whether the proposed fix 306 should be implemented.

Figure 3C:
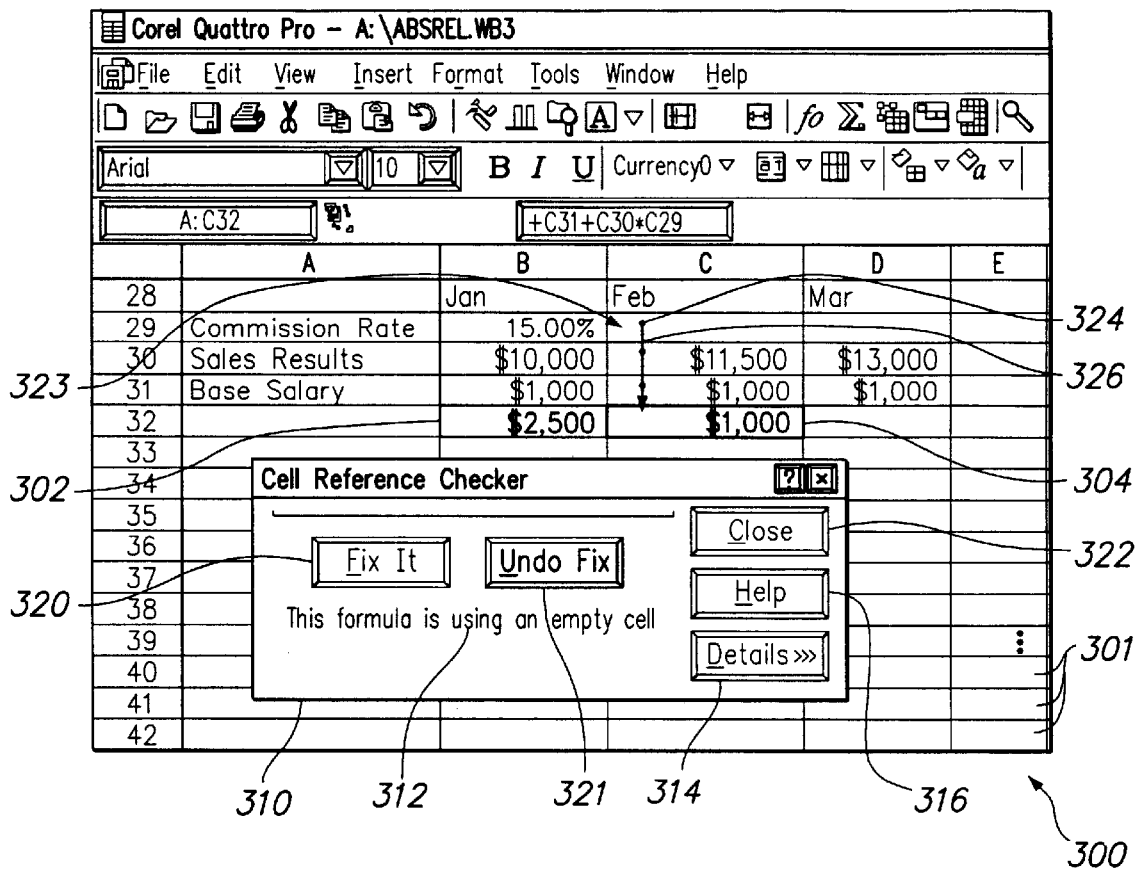
FIG. 3C is an exemplary screen shot of a cell reference checker dialog box and a dependency graph in accordance with the present invention.

Referring also to FIG. 3C, there is shown an exemplary screen shot of a dialog box 310 in accordance with the present invention. The spreadsheet 300 illustrated in FIG. 3C is identical to that of FIG. 3B, except that in FIG. 3B, the cell reference checking feature was disabled in a manner described below. In FIG. 3C, however, the error detection and correction module 136 detected that the formula in destination cell 304 contained a reference to a blank cell 301. As a result, a fix 306 was calculated in accordance with step 206, and the dialog box 310 was displayed 224.

The dialog box 310 includes a text field 312 for displaying a message to the user. In this case, the text field 312 informs the user that the formula of destination cell 304 contains a reference to an empty cell. Preferably, the text field 312 displays alternative messages depending on the nature of the cell reference error. For example, the text field 312 may also inform the user that the reference refers to a type mismatched or out-of-range cell.

Figure 3D:
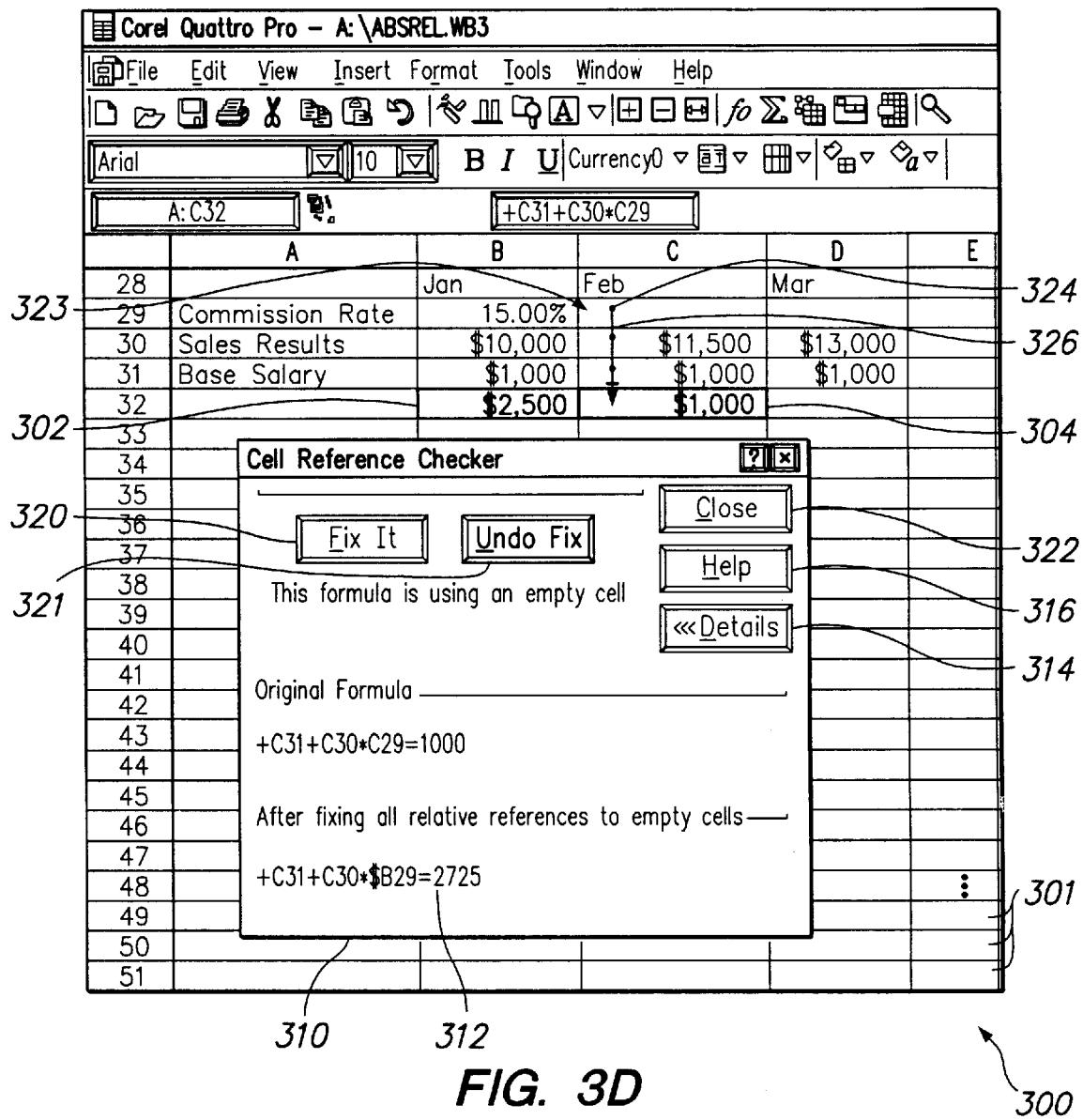
FIG. 3D is an exemplary screen shot of an expanded dialog box in accordance with the present invention.

The dialog box 310 also includes a "Details" button 314 for expanding the dialog box 310 to permit the display of more detailed information. Referring now to FIG. 3D, there is shown an expanded cell reference checker dialog box 310 in accordance with the present invention. Expanded dialog box 310 includes an expanded text field 312, which, for example, may display the original formula in destination cell 304, as well as the corrected formula after the fix 306 is implemented. In an alternative embodiment, the expanded dialog box 310 may provide additional functionality such as user-editable fields for changing all or part of the fix 306 before it is implemented. The expanded view is preferably removed by clicking again on the "Details" button 314.

Referring again to FIG. 3C, the dialog box 310 also includes a "Help" button 316 for providing additional, detailed information about the nature of error. Clicking on the "Help" button 316 preferably invokes the standard Windows 95 help facility, which loads a corresponding help file 318 (not shown) from storage device 124. Help file 318 provides detailed information about the purpose and function of cell reference checking system 120. In addition, for inexperienced users, the help file 318 explains the difference between absolute and relative addressing.

The dialog box 310 includes two other active buttons— the "Fix It" button 310 and the "Close" button 312. The "Fix It" button 320 is used to accept the proposed fix 306 stored in the fix memory 139. Conversely, the "Close" button 320 is used to reject the proposed fix 306. The operation of these two buttons will be more fully described below. In addition, one inactive button, the "Undo Fix" button 321, is preferably displayed in dialog box 310, but cannot be used until after the fix 306 is accepted, as described hereafter.

To further assist the user in determining whether to accept or reject the fix 306, in one embodiment the user dialog module 137 invokes the dependency display module 142, which displays a dependency graph 323 corresponding to the references that are used in destination cell 304. For example, in FIG. 3C, the destination cell 304 formula contains references to cells "C29," "C30," and "C31." Thus, in a preferred embodiment, dependency display module 142 draws the dependency graph 323, which includes origins or dots 324 in each of the referenced cells and lines 326 extending between the dots 324 and destination cell 304. As shown in FIG. 3C, the lines 326 may overlap. Preferably, lines 326 terminate with arrows 328 at destination cell 304. In addition, the dots 324 and portions of lines 326 are preferably color coded to provide visual feedback to the user as to which of the references contain errors. For example, if the referenced cell 301 is blank, type mismatched, or out-of-range, the dot 324 and a portion of the line 326 within the affected cell are preferably indicated in red or another suitable color distinguishable from the non-affected cells 301.

Additionally, in a preferred embodiment, the user may interact with the dependency graph 323 by clicking with the mouse 126 on one of the dots or origins 324. Thereafter, the user may drag the dot 324 to any of the cells 301 in the spreadsheet 300. This will have the effect of changing the reference in the destination cell 304 that points to the cell 301 containing the dot 324, allowing the user to edit the reference in the destination cell 304 without having to retype the reference. Preferably, the dependency display module 142 will update the graph 323 as the dot 324 is dragged by redrawing the line 326 associated with the dot 324.

Referring again to FIG. 2, after the user has been prompted 224 with the dialog box 310, the method continues by determining 226 whether the user accepts the fix 306. If the user accepts the fix 306 by selecting the "Fix It" button 320, then the method continues at step 230. If, however, the user rejects the fix 306 by selecting the "Close" button 322, then the method continues at step 228.

If fix 306 is rejected, then the method continues by closing the dialog box 310 and storing 228 an indication of the rejection in the rejection memory 138. Preferably, this is accomplished by copying the fix 306 in the fix memory 139 into an available portion of the rejection memory 138, after which the fix 306 is erased from the fix memory 139. As a result, if the user later attempts to perform a copy operation that produces the same fix 306, the user will not be prompted with the fix 306 again. In a preferred embodiment, the rejection memory 138 is cleared each time the spreadsheet application module 134 is terminated by the user. However, in an alternative embodiment, the rejection memory 138 is stored along with the spreadsheet 300 data in storage device 124.

If, in step 226, fix 306 is accepted, then the method continues by implementing 230 the fix 306. This is accomplished by inserting the fixed formula from the fix memory 139 into the destination cell 304. In the present example, the fixed formula "+C31+C30*$B29" is inserted into the destination cell 304.

Figures 3E, 3F:
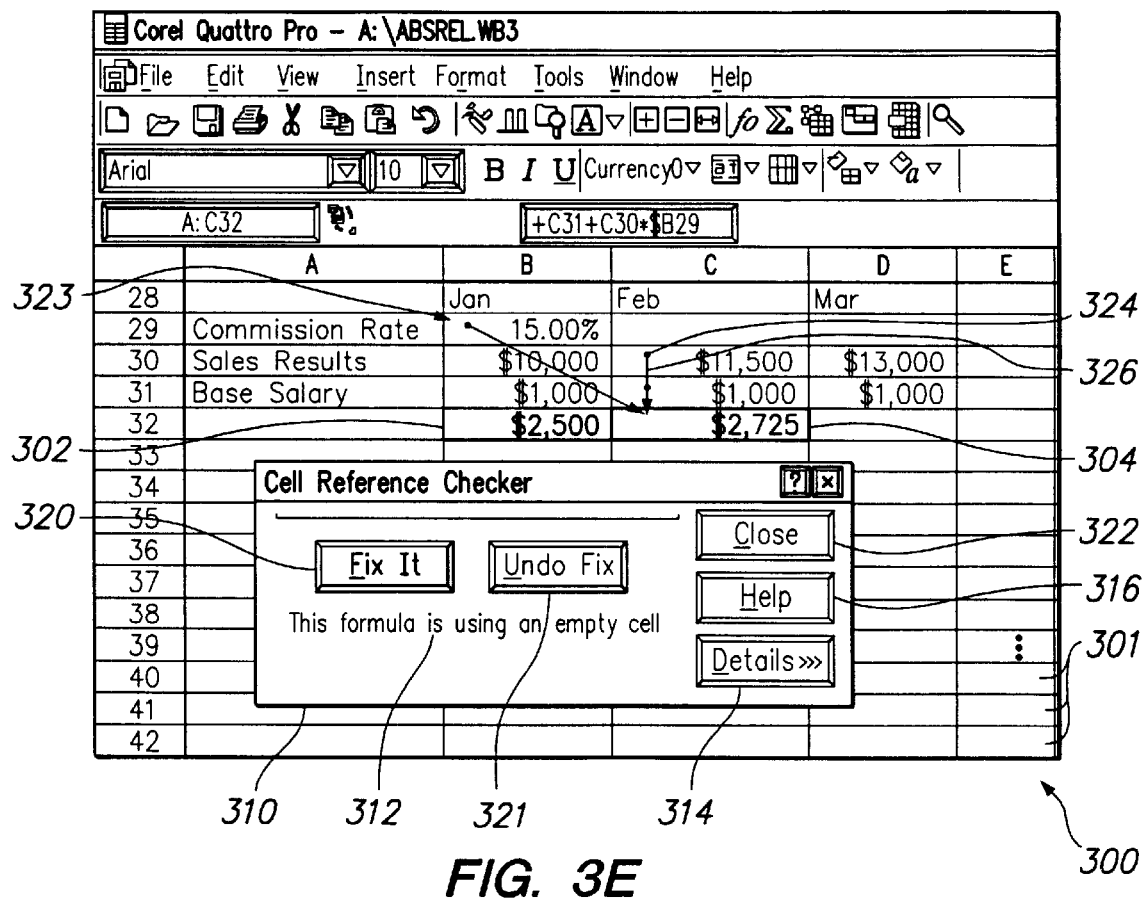
FIG. 3E is an exemplary screen shot of the cell reference checker dialog box after the user accepts the proposed fix.
FIG. 3F is an exemplary screen shot of a corrected spreadsheet in accordance with the present invention.
Figure 4A:
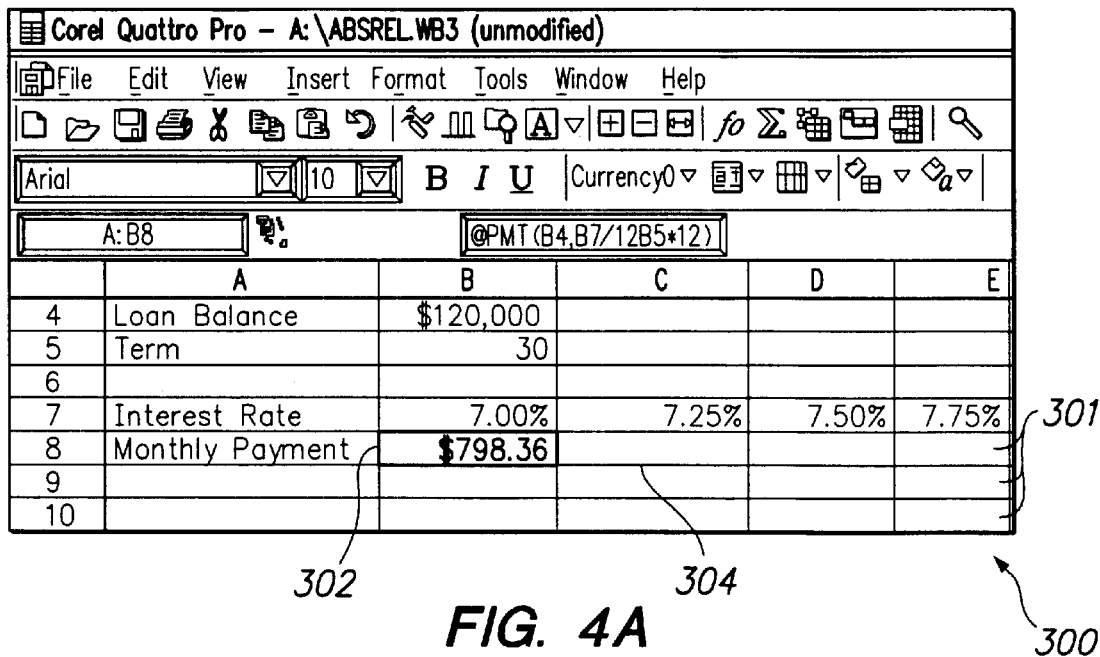
FIGS. 4A–B are exemplary screen shots of a second example of a cell reference error caused by cell copying.
Figure 4B:
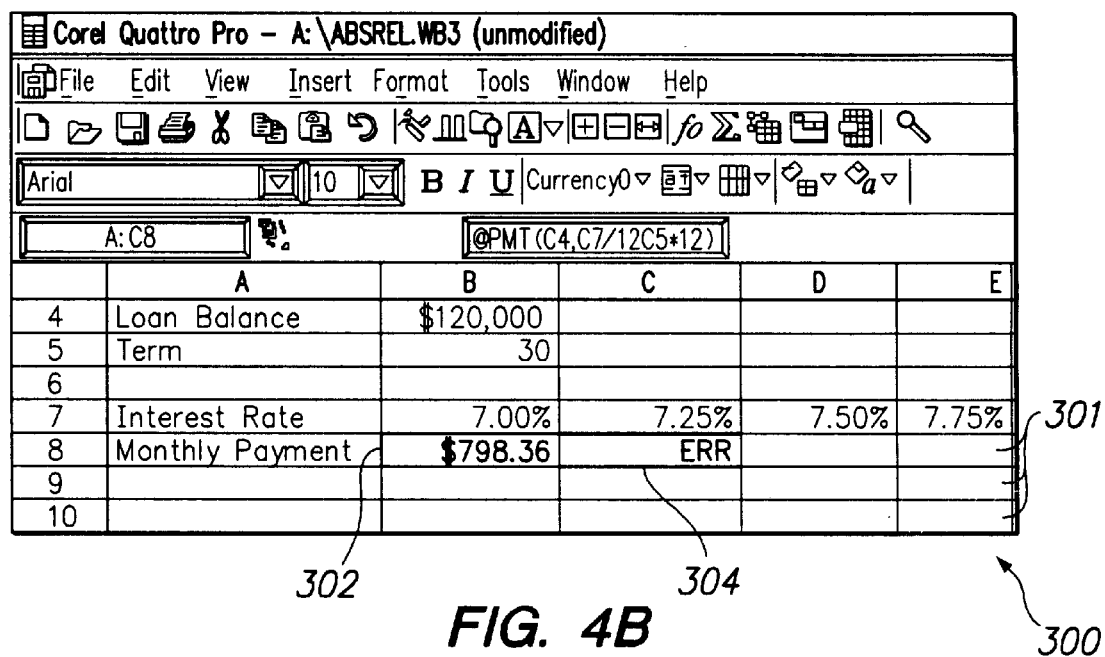

After implementing 230 the fix 306, the system 120 preferably gives the user an opportunity to "undo" the fix 306. As shown in FIG. 3E, after the "Fix It" button 320 is activated, the previously inactive "Undo Fix" button 321 becomes active. If the "Undo Fix" button 321 is then selected, the spreadsheet 300 is restored to a state before the fix 306 was implemented. One skilled in the art will recognize that this procedure may be easily accomplished by invoking an "undo" function, which exists in most Windows spreadsheets and related applications. However, other methods for restoring the spreadsheet 300 may be used without departing from the spirit of the invention.

To assist the user in deciding whether or not to undo the change, the dependency display module 142 again displays a dependency graph 323, now including the fixed references. FIG. 3E illustrates the new dependency graph 323. In this case, however, all of the dots 324 and lines 326 are displayed with same color since, by definition, no reference errors will exist in the fixed destination cell 304.

Referring again to FIG. 2, after the fix is implemented (and not undone), the method continues at step 232 by updating the original source cell 302 references in accordance with the fix 306. By accepting the fix 306, the user is indicating that one or more of the original references in the source cell 302 were erroneously entered as relative addresses. Therefore, in a preferred embodiment, the source cell 302 should incorporate the same relative-to-absolute conversions implemented in the destination cell 304. This step has the added effect that future copy operations in the same direction from the source cell 302 will not produce reference errors since the relevant references have been made absolute. Thereafter, since the fix 306 is now fully implemented, it is preferably erased from the fix memory 139. However, in an alternative embodiment, the fixes 306 could be retained to maintain a record of the relative-to-absolute conversions implemented in the spreadsheet 300.

Referring now to FIG. 3F, there is shown the spreadsheet 300 of FIGS. 3E after the dialog box is closed without activating the "Undo Fix" button 321. The source cell 302 has been updated 232 with fixed reference "$B29," in accordance with the fix 306 implemented in destination cell 304.

Figure 7:
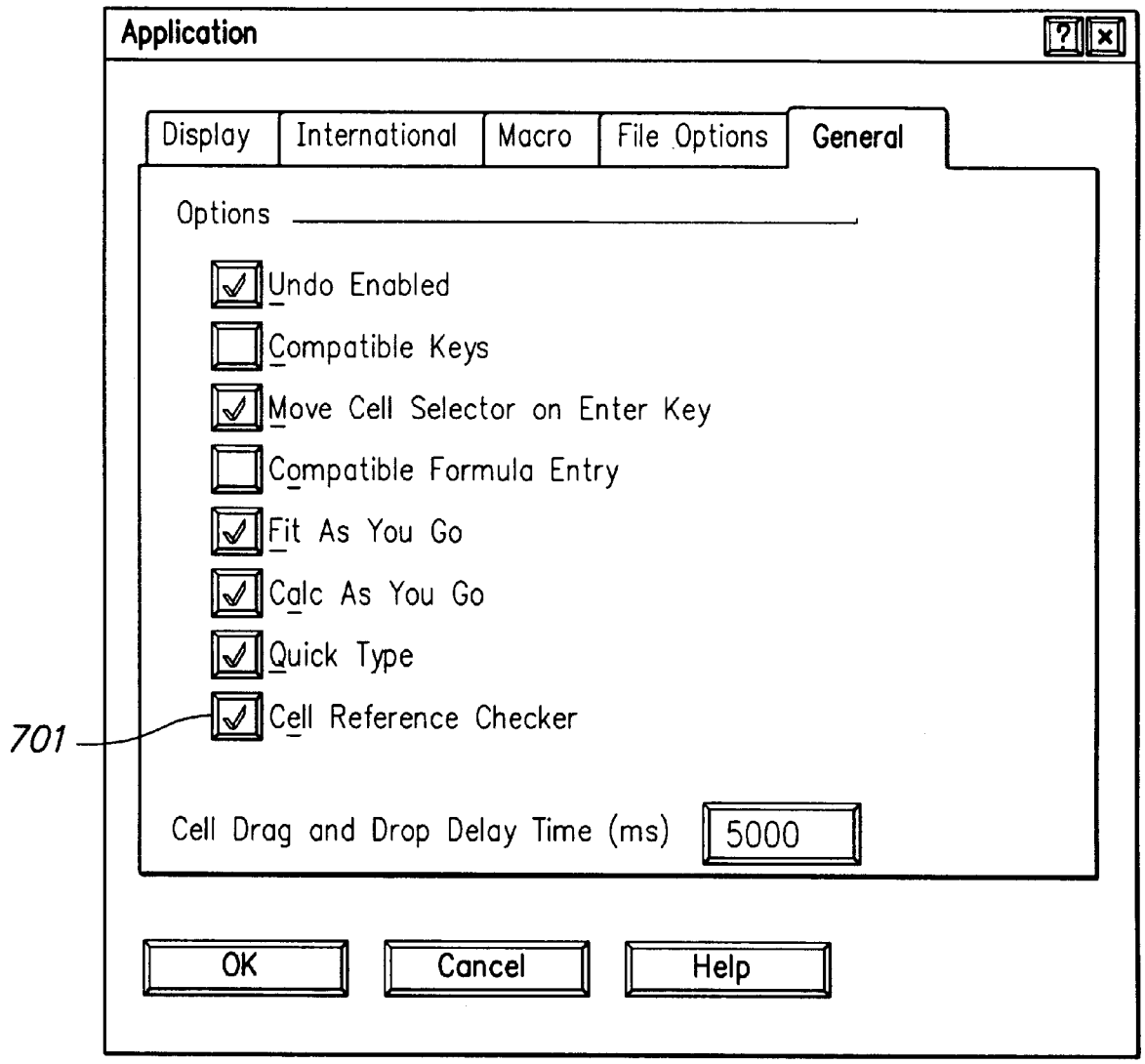
FIG. 7 is a screen shot of an options menu comprising a reference checking selector in accordance with the present invention.

In certain circumstances, it may be desirable to disable cell reference checking system 120 in spreadsheet application module 134. For example, experienced users may purposefully copy cells that contain references to values that do not yet exist. In such cases, it would not be desirable to prompt the user each time a reference error was detected. Referring now to FIG. 7, system 120 preferably includes a reference checking selector 701 for disabling and enabling the reference checking function. In a preferred embodiment, selector 701 is implemented as a check box in an "options" menu, as part of the spreadsheet applications module 137, although a variety of other implementations are possible. A user may thus disable the system 120 by removing the check from selector 701, after which time no reference errors will be detected.

While the present invention has been described with reference to certain preferred embodiments, those skilled in the art will recognize that various modifications may be provided. These and other variations upon, and modifications to, the preferred embodiments are provided for by the present invention, which is limited only by the following claims.

What is claimed is:

1. A method for detecting and selectively correcting reference errors in a computer-implemented spreadsheet, the spreadsheet comprising a plurality of cells including a source cell and a destination cell, each cell comprising an address having a row and a column component, at least one source cell comprising a formula, each formula comprising at least one reference to a cell address, the formula of each source cell having been copied into each destination cell, the method comprising:

a) automatically identifying a destination cell containing a formula with a reference error; and b) automatically correcting the reference error by converting a relative address of a cell reference in the formula to an absolute address.

2. The method of claim 1, wherein the reference error comprises a reference to a cell taken from the group of cells consisting of a blank cell, a type mismatched cell, and an out-of-range cell.

3. The method of claim 1, wherein b) comprises:
b.1) identifying the reference in the formula of the destination cell that caused the reference error;
b.2) calculating a relative-to-absolute conversion of the address of the reference that will correct the reference error;
b.3) prompting the user as to whether the conversion should be made in the spreadsheet; and
b.4) responsive to the user approving the conversion, converting the address of the reference in the spreadsheet in accordance with b.2).

4. The method of claim 3, wherein the column component of the address in b.2) is converted if the source cell and the destination cell are in different columns; and the row component of the address in b.2) is converted if the source cell and the destination cell are in different rows.

5. The method of claim 3, further comprising:
b.2.1) determining whether the conversion was previously rejected; and wherein b.3) and b.4) are performed if the conversion was not previously rejected.

6. The method of claim 3, further comprising:
b.2.1) determining whether converting the reference in the spreadsheet will create a formula calculation error; and wherein b.3) and b.4) are performed if the conversion does not create a formula calculation error.

7. The method of claim 3, further comprising
b.5) identifying a reference in the source cell that corresponds to the reference in the destination cell; and
b.6) responsive to the reference in the destination cell being converted in b.4), converting the reference in the source cell in the same manner that the reference in the destination cell was converted.

8. The method of claim 3, further comprising
b.5) responsive to the user rejecting the conversion, storing an indication of the rejection.

9. The method of claim 3, further comprising:
b.5) determining whether converting the reference in the destination cell displaces a non-converted reference in the destination cell; and
b.6) responsive to the non-converted reference being displaced, converting the address of the non-converted reference from a relative to an absolute address.

10. The method of claim 3, further comprises
b.5) displaying a dependency graph corresponding to the references in the formula of the destination cell.

11. The method of claim 10, wherein the dependency graph comprises at least one origin situated in a first cell referred to by a reference in the destination cell; and at least one line extending from the at least one origin to a point in the destination cell.

12. The method of claim 11, further comprising:
b.6) changing the reference in the destination cell responsive to the at least one origin being moved from the first cell to a second cell.

13. The method of claim 12, wherein the origin is moved by dragging the origin with a pointing device.

14. A system for automatically detecting and selectively correcting reference errors in a computer-implemented spreadsheet, the system comprising:
a spreadsheet application module for providing a spreadsheet comprising a plurality of cells arranged by row and column, the cells including a source cell and a destination cell, the source cell comprising a formula including at least one reference;
coupled to the spreadsheet application module, a cell copier module for copying the formula of the source cell into the destination cell; and
coupled to the cell copier module, an error detection and correction module for automatically detecting and selectively correcting a reference error by converting a relative address of a cell reference in the formula to an absolute address.

15. The system of claim 14, wherein the reference error comprises a reference to a cell taken from the group consisting of a blank cell, a type mismatched cell, and an out-of-range cell.

16. The system of claim 14, further comprising:
coupled to the error detection and correction module, a user dialog module for displaying information to a user and for receiving user responses.

17. The system of claim 16, wherein the user dialog module comprises:
a dialog box for notifying the user of the reference error, for prompting the user as to whether the reference error should be corrected, and for receiving the user's response.

18. The system of claim 17, wherein the dialog box comprises:
a text field for displaying the type of the reference error, wherein the type of error is taken from the group consisting of a reference to blank cell, a reference to type mismatched cell, and a reference to an out-of-range cell.

19. The system of claim 16, further comprising:
coupled to the user dialog module, a dependency display module for displaying a dependency graph corresponding to the references in the formula of the destination cell.

20. The system of claim 19, wherein the dependency graph comprises at least one origin situated in a first cell referred to by a reference in the destination cell; and at least one line extending between the at least one origin and a point in the destination cell.

21. The system of claim 20, wherein, responsive to the origin being moved from the first cell to a second cell, the reference is changed to refer to the second cell.

22. The system of claim 21, wherein the origin is moved by dragging the origin with a pointing device.

23. The system of claim 19, wherein the dependency graph is color coded for indicating whether a cell creates a reference error.

24. The system of claim 14, further comprising:
coupled to the error detection and correction module, a first memory for storing a first relative-to-absolute conversion of an address.

25. The system of claim 24, further comprising:
coupled to the error detection and correction module, a second memory for storing at least one relative-to-absolute conversion that was previously rejected by a user.

26. The system of claim 25, wherein the first memory is compared with the second memory in order to determine whether the first relative-to-absolute conversion is among the rejected relative-to-absolute conversions, and the reference error is not corrected if the first relative-to-absolute conversion is among the rejected conversions.

27. The system of claim 14, wherein the error detection and correction module may be selectively disabled responsive to a selector means.

28. A computer program product comprising a computer-usable medium having computer-readable code embodied therein for automatically detecting and selectively correcting reference errors in a computer-implemented spreadsheet, the spreadsheet comprising a plurality of cells including a source cell and a destination cell, each cell comprising an address having a row and a column component, the source cell comprising a formula, the formula comprising a reference to a cell address, the computer program product comprising:

- a) computer-readable program code devices configured to cause a computer to copy the formula of a source cell into a destination cell;
- b) computer-readable program code devices configured to cause a computer to automatically identify a destination cell containing a formula with a reference error;
- c) computer-readable program code devices configured to cause a computer to identify the reference in the destination cell that caused the reference error;
- d) computer-readable program code devices configured to cause a computer to calculate a relative-to-absolute conversion of the address of the reference that will correct the reference error; and
- e) computer-readable program code devices configured to cause a computer to convert the address of the reference in accordance with the calculation in d).

29. The computer program product of claim 28, wherein e) comprises:

- e.1) computer-readable program code devices configured to cause a computer to determine whether a user approves of the conversion; and
- e.2) computer-readable program code devices configured to cause a computer to, responsive to the user approving the conversion, convert the address of the reference from a relative address to an absolute address.

30. The computer program product of claim 28, further comprising:

- f) computer-readable program code devices configured to cause a computer to determine whether the conversion was previously rejected; and wherein e.1) and e.2) are performed if the conversion was not previously rejected.

31. The computer program product of claim 28, further comprising:

- f) computer-readable program code devices configured to cause a computer to determine whether converting the reference in the spreadsheet will create a reference error; and wherein e.1) and e.2) are performed if the conversion does not create a reference error.

32. The computer program product of claim 28, further comprising:

- f) computer-readable program code devices configured to cause a computer to display a user-editable dependency graph corresponding to the references in the formula of the destination cell.

33. A method for automatically detecting and selectively correcting reference errors in a computer-implemented spreadsheet, the spreadsheet comprising a plurality of cells, each cell comprising an address having a row and a column component, at least one cell comprising a formula, the formula comprising a reference to a cell address, the method comprising:

- a) automatically identifying a reference that causes a reference error;
- b) notifying a user of the reference error; and
- b) selectively changing the address of the reference from a relative reference to an absolute reference responsive to an indication from the user.

34. The method of claim 33, wherein the notification step comprises displaying a dependency graph, and the indication from the user comprises moving an origin in the dependency graph from a first cell to a second cell.

* * * * *